Patented Oct. 24, 1950

2,527,065

UNITED STATES PATENT OFFICE 2,527,065

PROCESS OF MAKING RESINOUS ALDEHYDE TAR ACIDS AND HYDROCARBON OIL CONDENSATION PRODUCTS

Benjamin W. Jones, Robinson Township, Washington County, Pa., assignor to Pittsburgh Consolidation Coal Company, Pittsburgh, Pa., a corporation of Pennsylvania No Drawing. Application July 31, 1947,
Serial No. 765,265

5 Claims. (Cl. 260—51)

This invention relates to a process of making synthetic resins by direct treatment of tar distillate or other suitable mixture of tar acids and hydrocarbon oil with an aldehyde bearing substance, for example, formaldehyde solution, without first separating the tar acids from the tar distillate. The reaction is carried out in an aqueous medium containing caustic soda or other alkali metal hydroxide catalyst. The concentration of alkali metal hydroxide and aldehyde bearing substance in the aqueous phase at the start of the reaction, the time and temperature of the reaction and the concentration of alkali metal hydroxide in the aqueous phase at the end of the reaction are preferably so regulated that after stirring is discontinued the reaction mixture separates into only two layers, one layer (usually the top layer) being treated oil and the other layer (usually the bottom layer) an aqueous solution of water soluble resin. The aqueous solution of water soluble resin is separated from the treated oil, and the resin is then precipitated from the aqueous solution by dilution or by addition of acid; or the aqueous solution may be concentrated and used as such—for instance, as a thermosetting adhesive.

A thermosetting adhesive resin solution which can be diluted with water and is useful as a plywood glue can also be made from the precipitated resin by dissolving it in caustic soda solution. Such a resin solution will contain more than 50% of resin if a suitable amount of soda solution of suitable concentration is used. This method can be used where no vacuum drying equipment is available.

With certain reaction conditions, the reaction mixture settles into three layers instead of two, the treated oil being on top, the aqueous resin solution being in the middle, and a layer of wet resin being on the bottom. This invention pertains to the formation and treatment of aqueous resin solutions, and in its broader aspect is not to be avoided by the formation of a layer of wet resin below the aqueous layer which contains a substantial amount of water soluble resin in solution.

Laminating varnishes which are highly satisfactory for lamination of paper, wood veneers or fabric may be obtained by neutralization or acidification of the water solution of resin produced as above described, settling and separating the resin and dissolving it in alcohol or other suitable non-aqueous solvent without dehydrating the resin and without substantial advance of the resin toward the cured state. If the alkaline aqueous solution of resin is produced by treatment of a crude dark colored tar-distillate, merely neutralizing it results in precipitation of all of the dark colored resin, which may be removed after settling. The remaining water solution of resin may then be acidified causing precipitation of light colored resin which, after settling, may be removed from the acidified solution.

Thermosetting resins, of different rates of advance or progress to the insoluble infusible state, may be made by successive partial treatments of tar distillates or other suitable mixtures of tar acids and hydrocarbon oils with an aldehyde bearing substance and alkali metal hydroxide, and separate removal of the aqueous solution of resin from each successive treatment.

The conditions used in producing the aqueous solution of resin may be selected and controlled so that the resin solution will be of such quality as to permit a high degree of dilution with water without clouding of the solution or precipitation of resin.

In its broadest scope, this invention involves the treatment of high or low temperature tar distillate or petroleum distillate, consisting principally of tar acids and hydrocarbon oil, or any mixture consisting principally of tar acids and hydrocarbon oil, by stirring with an aldehyde bearing substance in the presence of water and an alkali metal hydroxide catalyst in proper concentration for a suitable length of time and at a sufficiently low temperature to cause the formation of an aqueous layer containing water soluble resin in solution, and the treatment of the aqueous resin solution in the manner hereinafter described. Preferably the reaction time and other reaction conditions are such that after stirring is discontinued, the reaction mixture separates, in most cases rapidly, into two layers, viz., an upper layer of incompletely reacted or unreacted treated oil and a bottom aqueous layer containing the resin in water soluble form. In some cases the relative densities may be such that the aqueous resin solution is on top of the treated oil.

The following examples illustrate some of the preferred procedures for carrying out my invention.

Example 1

A tar distillate comprising approximately the lowest boiling 30% of "Disco" low temperature coal tar and having a distillation range of approximately 180 to 320° C. and containing about 45% tar acids by volume is provided. The low temperature coal tar which was distilled in order to produce the tar distillate of this example was that resulting from the low temperature coking, carbonizing or distillation treatment of bituminous coal as described in Technical Publication No. 1176-F. 116, American Institute of Mining and Metallurgical Engineers, by C. E. Lesher, entitled "Production of Low-Temperature Coke by the Disco Process." According to that process the low temperature carbonization of coal is carried out preferably at a temperature of about 850° F., the range of temperature being from about 775° F. to 900° F. The tar distillate used in this example was obtained by subjecting the low temperature "Disco" tar to batch steam and vacuum distillation carried (without a fractionating column) to about 375° F. liquid temperature. This distillation removes about 30% by volume of the low temperature coal tar. The tar distillate contained about 45% tar acids by volume, these tar acids presumably being composed principally of phenols, cresols, xylenols and higher boiling types.

To the tar distillate comprising approximately the lowest boiling 30% of "Disco" low temperature coal tar were added formaldehyde solution (37% U. S. P. grade) and 10% caustic soda solution in the relative proportions of one part by weight of 37% formaldehyde solution and 0.8 part by weight of 10% caustic soda solution per part of contained tar acid. (This is in the ratio of one part NaOH to 12½ parts tar acid.) (The aqueous phase before the start of the reaction contained approximately 225 gms. HCHO per liter and 50 gms. NaOH per liter.)

The reaction mixture was stirred at room temperature (approximately 25° C.) until no change in weight occurred in the two phases (aqueous layer and treated-oil layer). This usually occurs after stirring the mixture for twenty-four hours or longer and can be determined by removing a small sample of the charge frequently and allowing separation of the two layers to take place. It was found that, when equilibrium in the relative weights of the two phases had been established, about 34.5% by weight of the tar distillate had gone into the aqueous phase. (This is about 9.6 parts tar acids removed from the oil per part NaOH, or more than three times as much tar acid as can be removed by the same amount of NaOH without formaldehyde.) Stirring was discontinued and the mixture was allowed to stand until separation of the two phases was complete. (This will usually require one-half hour or more and the top layer of treated oil will usually contain about 19% tar acids and about 5% by weight of oil-soluble resin, the latter being determined by precipitation with petroleum naphtha.)

The water solution of resin (bottom layer) was withdrawn and added slowly to 10% sulphuric acid during agitation until the mixture had a pH between 1 and 2. Agitation was then discontinued, the resin was allowed to coagulate and settle and was separated from the solution. Three possible procedures are possible from here on:

(a) The resin, containing some entrained or dissolved water, can be dissolved in alcohol or other suitable non-aqueous solvent so as to contain 60% resin of the thermosetting type with particularly good penetrating power for fibrous materials, or, (b) The resin can be dehydrated at 100° F. (under vacuum), or to a higher temperature, until practically all of the water is removed, and then dissolved in alcohol or other suitable solvent to make a varnish. This type of varnish, comparatively free from water, has better "shelf life" and is more suitable for treating materials of low wet strength.

(c) The resin can also be dissolved in strong caustic soda solution (for example, 50%) and adjusted with water so as to contain 50% resin. This material is suitable for use as a plywood adhesive.

Paper or fabric, impregnated with either type of varnish, may be dried, heat-treated, piled in layers, and pressed between hot plates for sufficient time to form a cured laminate.

*Example 2*

A procedure similar to that shown in Example 1 was carried out through the point of separating the water solution of resin from the treated oil. The water solution of resin was then thoroughly washed with petroleum naphtha to remove small quantities of hydrocarbon and other impurities. It can then be treated in two ways to produce a water soluble resin suitable for use as a plywood adhesive of the thermosetting type:

(a) The water solution of resin can be concentrated under vacuum at a temperature of 100° F. or higher to a resin content of 40% or higher, or (b) The water solution of resin can be treated with dilute sulfuric acid to precipitate the resin which after settling is removed. It is then dissolved in strong caustic soda solution and adjusted with water to 50% resin.

*Example 3*

A procedure similar to that shown in Example 1 was carried out through the point of separating the water solution of resin from the treated oil. The resin was then partially precipitated by stirring the water solution of the resin into three or four volumes of water, thus precipitating a considerable amount of resin and then adding dilute sulphuric acid until the pH of the mixture was approximately 7, thus precipitating more (but not all) of the resin. Agitation was then stopped and practically all the precipitated resin coagulated, and, after settling, was moved. It was dark colored, thermosetting and suitable for laminating use after being dissolved in isopropyl alcohol. The remaining water solution contained light colored resin which was precipitated from solution by the addition of dilute acid, while stirring, until the pH of the mixture was 1 to 2. Agitation was then stopped and, after settling, the light colored resin layer was removed. It was viscous at room temperature and contained about 80% resin and nearly 20% water. It dissolved readily in isopropyl alcohol to make a varnish of 60% resin. The resin is thermosetting and can be used for laminating. Alternatively, the small amount of acid in the separated light colored resin can be neutralized with very dilute alkali, and the resin then dehydrated under vacuum, and then dissolved in alcohol to make a light colored laminating varnish.

*Example 4*

The tar distillate described in Example 1 can be treated in several steps with formaldehyde and caustic soda solutions with removal of water soluble resin at the end of each step. By this procedure resins of different rates of speed to final cure (rates of progress to the insoluble infusible form) can be produced. One procedure is as follows:

To the tar distillate, formaldehyde solution (37%) U. S. P. grade, and 10% caustic soda solution were added in the relative proportions of 0.67 part by weight of 37% formaldehyde solution and 1.05 parts by weight of 10% caustic soda solution per part of contained tar acid. (The aqueous phase at the start of the reaction contained approximately 157 gms. HCHO per liter and 67 gms. NaOH per liter.) The mixture was stirred at room temperature (approximately 25° C.) until no change in weight occurred in the two phases (24 hours). Stirring was then discontinued and the mixture allowed to stand at room temperature over night (about 14 hours). This length of time was not necessary for complete settling but done only because of convenience. The water solution of resin was then withdrawn and represents the product of the first step treatment of the tar distillate.

To the treated oil (top layer from the first step), formaldehyde (37% solution) and 10% caustic soda solution were added in the same relative proportions but slightly less than one third of the amounts which were added in the first step. The mixture was stirred at room temperature (approximately 25° C.) until no change in weight occurred in the two phases (24 hours). Stirring was discontinued and the mixture allowed to stand 24 hours at room temperature. The water solution of resin was then withdrawn and represents the product of the second step.

To the treated oil, remaining from the second step, solutions of formaldehyde and caustic soda were added in the same relative proportions but equivalent to approximately one sixth of the amounts added in the first step. The mixture was stirred at room temperature for 27 hours, stirring discontinued, and the mixture allowed to stand 19 hours at room temperature after which the water solution of resin was withdrawn and represents the product of the third step.

All three of the water solutions of resin were then acidified separately as described in Example 1 to pH 1 to 2. After settling, the resins were removed and dissolved in isopropyl alcohol to make varnishes containing 60% resin. Approximately 37% by weight of the tar distillate was converted to resin by the three step treatment. Of the total resin recovered, 74% was produced in the first step, 17% in the second step, and 9% in the third step. The "gel" time (time required for the resin to become rubbery when a sample of the varnish is maintained at 153° C.) was 9 minutes for the first step, 40 minutes for the second step, and very much longer for the third step.

Example 5

A procedure similar to that shown in Example 1 was used to produce thermosetting resin from a tar distillate comprising approximately 52% of the "Disco" low-temperature coal tar and containing approximately 37% tar acids. The tar distillate was made by mixing about 27 gallons of the lowest boiling 30% "Disco" distillate of Example 1 and 25 gallons of a creosote oil. The creosote oil is a much higher boiling oil than the 30% fraction and the tar acids in the creosote oil are much higher boiling than the tar acids in the 30% fraction. The creosote oil contains some tar acids which cannot be distilled at atmospheric pressure without decomposition. The lowest boiling 30% distillate was produced from the tar by steam and vacuum distillation carried to about 375° F. liquid temperature. The still residue after such distillation contains tar acids and hydrocarbons of higher boiling point which can be driven off in the form of creosote oil if higher temperatures are employed. The creosote oil is preferably obtained by contacting a number of small streams of the still residue from the 375° F. distillation with a bed of moving hot coke which is maintained at a temperature of about 900° F. in the pitch coker described in the application of Caleb Davies, Jr., Serial No. 639,376, filed January 5, 1946 and now abandoned. The feed material is distilled in the coker to form coke, oil vapors and gas. The mixture of gas and oil vapors is cooled in two stages, the second stage condensate being known as creosote oil and containing about 32% tar acids. The resins produced from creosote oil are not as strong as those produced from the lower boiling 30% fraction, but the creosote oil can be mixed with the lower boiling fraction to form a cheaper starting product and to produce a resin which is satisfactory for many purposes.

Example 6

Procedures similar to that shown in Examples 2, 3 and 4 can be used to treat a tar distillate such as that described in Example 5.

As previously stated, in practicing my invention the reaction is carried out preferably in such manner that after stirring is discontinued the reaction mass separates into only two layers, one of which is a solution of water soluble resin. The advantages of a two layer separation (as contrasted with a three layer separation in which the top layer is treated oil, the middle layer is an aqueous layer and the bottom layer is precipitated resin) will be pointed out more in detail hereinafter.

In my preferred process the conditions are controlled so that the resin is not advanced to the point where it will precipitate from an aqueous solution containing a moderate amount of caustic soda. If in the process the temperature gets too high, some of the resin will advance to such an extent as to be insoluble in the alkaline aqueous solution. It is preferable to conduct the reaction at about room temperature (25° C.) to prevent the resin from advancing too rapidly. However, temperatures as high as 50° C. or even 100° C. can be used for shorter periods of time. At temperatures above 100° C. the reaction takes place too rapidly and a three layer separation results.

The concentration of sodium hydroxide in the aqueous resin solution is very important in avoiding the precipitation of resin in order to maintain the preferred two-phase condition. The caustic soda apparently acts both as a catalyst in the reaction between tar acids and formaldehyde and as a means of keeping the resin in soluble form.

In order to perform its function satisfactorily, the concentration of sodium hydroxide in the aqueous phase at the start of the reaction should not be less than about 35 to 40 grams per liter and at the end of the reaction not less than about 20 to 25 grams per liter, and preferably about 50 grams per liter at the start of the reaction and about 25 to 30 at the end of the reaction. Considerably higher concentrations of sodium hydroxide in the aqueous phase can be tolerated (for example, 100 grams per liter at the start of the reaction) but in order to prevent contamination of the aqueous resin solution with tar acids which do not react with formaldehyde to any appreciable extent and at the same time to avoid the tendency for excessive advance of the more reactive resins in the presence of extremely high concentrations of alkali metal hydroxide, it is advisable to limit its concentration in the aqueous phase at the start of the reaction to not over about 100 grams per liter. In the preferred procedure, about 10% excess formaldehyde over that required to react with the tar acids is employed in order to insure the maximum utilization of those tar acids which will combine with formaldehyde to form resins.

The distillate of Example 1 comprising approximately the lowest boiling 30% of "Disco" low temperature coal tar contains about 45% tar acids, about 50% neutral oils and about 5% tar bases. Some of the lower boiling fractions of this distillate contain more tar acids, while some of the higher boiling fractions of the distillate contain less tar acids. According to the distillation temperature employed, the tar acids might be as low as 20 to 25% or as high as 60 to 65% and the neutral oil might therefore be about 35 to 80%. These percentages, of course, apply only to distillates obtained from "Disco" low temperature coal tar. Distillates obtained from other sources may contain greater or less amounts of tar acids. My process is applicable to the treatment of distillates or other mixtures of tar acids and neutral oils which contain anywhere from 10% to 90% of tar acids. In addition to the tar acids, there is usually present a small amount of so-called tar bases. According to my invention the low boiling fraction, the medium boiling fraction or the high boiling fraction of tar may be employed as the source of the tar acids and the tar may have been made by either low temperature or high temperature carbonization. The tar may be either coal tar or petroleum tar or mixtures thereof. In place of formaledhyde, I may use other similar substances containing an aldehyde group or which on heating form an aldehyde group, such as acetaldehyde, paraformaldehyde, hexamethylene tetramine and the like. In place of sodium hydroxide, I may use other alkali metal hydroxides, for example, potassium hydroxide or lithium hydroxide. In my process sodium carbonate is not the equivalent of sodium hydroxide. I have found that in carrying out my process the stronger alkali is necessary in order to obtain the two layer separation preferred according to my invention and to avoid making a three phase mixture. In place of sulphuric acid, I may use other acids, including carbonic acid and organic acids for neutralizing or acidifying the water solutions of the resins.

The present invention, when carried out in such manner as to produce the preferred two-phase mixture, has many advantages over the three layer separation of the prior art, as exemplified by Burke Patent 1,814,124 and Caplan Patent 1,907,497.

(1) My resin is in water soluble form, with the result that there is much less oil occluded in the resin than in the resin produced by the three layer separation. Furthermore, even the small amount of oil which is in the water solution of resin can be completely removed by washing with a solvent such as petroleum naphtha or benzole. This is a distinct advantage over the Caplan Patent 1,907,497 which proposed washing the layer of resin produced by the Burke three layer process with a solvent, i. e., petroleum naphtha which is a solvent for nearly all of the hydrocarbons and tar acids of the tar distillate, but in which the resin is practically insoluble. Resin in this form is so viscous that it is impossible to get sufficiently intimate contact between resin and naphtha to effect complete removal of occluded or dissolved oil.

(2) My resin is not as far advanced as the resin of the Burke patent, with the result that it has more useful properties when used as a bonding material. Whereas the Burke resins are insoluble in water, my resins are in water soluble form and can be used as a thermosetting adhesive after removal of only a part of the water by vacuum evaporation carried out at a temperature which is low enough to prevent much advance of the resin.

(3) My resins can be removed from their aqueous solutions by neutralization or acidification, separated by gravity and then, without dehydrating them, can be dissolved in alcohol to produce a varnish for laminating fibrous materials such as paper or fabrics. An alcohol varnish of this type containing 60% resin and 8 to 10% water has great penetrating power for fibrous materials because of good wetting properties due to its water content and low viscosity. Both water tolerance and fluidity of alcoholic resin solutions are decreased by "advance" (or increase of molecular size) of the resin. In contrast to my resins, the resins produced by the Burke three layer process are usually more advanced than mine, since they are insoluble in the aqueous phase. Thus their alcoholic solutions are not water tolerant and so they must be dehydrated before dissolving in alcohol. This dehydration further advances them, adding to the increase of viscosity of their varnishes over my low-viscosity varnish of the same resin content.

(4) The Caplan patent above referred to also proposed the addition of solvents such as petroleum naphtha to the reacting mixture of the tar distillate with formaldehyde and catalyst during agitation. The disadvantage of this procedure is that dilution of the tar hydrocarbons with such a solvent results in precipitation of resins (soluble in tar oils but insoluble in petroleum oils) which are extremely slow in advancing to the insoluble infusible form under the influence of heat.

My process is selective in that the tar acids which do not condense readily with formaldehyde in the presence of caustic soda do not become a part of the aqueous resin solution but instead are retained in the oil phase. In this respect the process is superior to that proposed by Bhagwat Patent 1,948,465 in which the tar acids are first extracted from the tar distillates by caustic soda solution and the separated phenolate solutions are treated with formaldehyde. By extracting all of the tar acids from the distillates according to Bhagwat patent, some tar acids which do not form resins of good setting properties are included, whereas by applying the formaldehyde directly to the distillate according to my process these tar acids which do not form resins having good setting properties are retained in the oil layer either as free tar acids or as slow-setting oil-soluble resins. Accordingly, a superior product can be obtained according to my process.

Another advantage of my process over the Bhagwat Patent 1,948,465 is the saving in the amount of caustic soda required, since Bhagwat uses soda equivalent to all tar acids used. This is illustrated by the fact that when the same type of distillate as that described in Example 1 hereof was treated with the same amount of 10% caustic soda solution without formaldehyde, only 10.4% by weight of the tar distillate was converted to phenolate, and so much more soda would be required in order to get a commercial yield. By my process 34.5% by weight of the tar distillate was converted to water soluble resin.

The invention is not limited to the examples which have been given merely for purposes of illustration, but may be otherwise embodied or practiced within the scope of the following claims.

I claim:

1. In the process of making resinous condensation products, the steps which comprise stirring a solution containing principally tar acids and hydrocarbon oil with an aliphatic aldehyde, an alkali metal hydroxide and water, maintaining the temperature of the stirred mixture below about 100° C., regulating the concentration of said alkali metal hydroxide in the aqueous phase so that at the start of the reaction it is about 35 to 100 grams per liter of aqueous phase and at the end of the reaction it is at least about 20 grams per liter of said phase, continuing the stirring until a water soluble resin is obtained in the aqueous phase, separating the aqueous phase containing the water soluble resin and mixing it with acid to precipitate resin, and recovering the resin.

2. In the process of making resinous condensation products, the steps which comprise stirring a solution consisting essentially of tar acids and hydrocarbon oil with formaldehyde, sodium hydroxide and water, maintaining the temperature of the stirred mixture below about 100° C., regulating the concentration of said sodium hydroxide in the aqueous phase so that at the start of the reaction it is about 35 to 100 grams per liter of aqueous phase and at the end of the reaction it is at least about 20 grams per liter of said phase, continuing the stirring until a water soluble resin is obtained in the aqueous phase, separating the aqueous phase containing the water soluble resin and mixing it with acid to precipitate resin, and recovering the resin.

3. In the process of making resinous condensation products, the steps which comprise stirring a mixture of distillates from tar obtained by low temperature carbonization of bituminous coal and containing tar acids and hydrocarbon oils with formaldehyde, sodium hydroxide and water, maintaining the temperature of the stirred mixture below about 100° C., regulating the concentration of said sodium hydroxide in the aqueous phase so that at the start of the reaction it is about 35 to 100 grams per liter of aqueous phase and at the end of the reaction it is at least about 20 grams per liter of said phase, continuing the stirring until a water soluble resin is obtained in the aqueous phase, mixing the aqueous phase containing the water soluble resin with acid to precipitate resin, and recovering the resin.

4. In the process of making resinous condensation products, the steps which comprise stirring a solution containing principally tar acids and hydrocarbon oil with an aliphatic aldehyde, an alkali metal hydroxide and water, the amount of aldehyde in the mixture being insufficient to react with all of the tar acids, maintaining the temperature of the stirred mixture below about 100° C., regulating the concentration of said alkali metal hydroxide in the aqueous phase so that at the start of the reaction it is about 35 to 100 grams per liter of aqueous phase and at the end of the reaction it is at least about 20 grams per liter of said phase, continuing the stirring until a water soluble resin is obtained in the aqueous phase, separating the aqueous phase containing the water soluble resin and mixing it with acid to precipitate resin, and recovering the resin.

5. In the process of making resinous condensation products, the steps which comprise stirring a solution consisting essentially of tar acids and hydrocarbon oil with formaldehyde, sodium hydroxide and water, the amount of formaldehyde in the mixture being insufficient to react with all the tar acids, maintaining the temperature of the stirred mixture below about 100° C., regulating the concentration of said sodium hydroxide in the aqueous phase so that at the start of the reaction it is about 35 to 100 grams per liter of aqueous phase and at the end of the reaction it is at least about 20 grams per liter of said phase, continuing the stirring until a water soluble resin is obtained in the aqueous phase, mixing the aqueous phase containing the water soluble resin with acid to precipitate resin, and recovering the resin.

BENJAMIN W. JONES.

REFERENCES CITED

The following references are of record in the file of this patent:

UNITED STATES PATENTS

| Number | Name | Date |
| --- | --- | --- |
| 1,946,459 | Granger | Feb. 6, 1934 |
| 1,956,530 | Granger | Apr. 24, 1934 |